(12) United States Patent
Matsuda et al.

(10) Patent No.: US 7,292,362 B2
(45) Date of Patent: Nov. 6, 2007

(54) FACSIMILE APPARATUS

(75) Inventors: Hirofumi Matsuda, Osaka (JP); Junji Matsui, Osaka (JP); Hiroshi Mori, Osaka (JP); Ken Imai, Osaka (JP); Yuki Shibahara, Osaka (JP); Yuichiro Iwase, Osaka (JP); Yoshihisa Kuramae, Osaka (JP)

(73) Assignee: Kyocera Mita Corporation (JP)

( * ) Notice: Subject to any disclaimer, the term of this patent is extended or adjusted under 35 U.S.C. 154(b) by 656 days.

(21) Appl. No.: 10/780,184

(22) Filed: Feb. 17, 2004

(65) Prior Publication Data

US 2005/0179957 A1    Aug. 18, 2005

(51) Int. Cl.
    *G06K 1/00* (2006.01)
(52) U.S. Cl. ............ 358/1.15; 358/402; 358/407
(58) Field of Classification Search ........ 358/400, 358/402, 1.15, 1.16, 468, 407; 706/206; 379/100.08, 100.09
    See application file for complete search history.

(56) References Cited

U.S. PATENT DOCUMENTS

| | | | |
|---|---|---|---|
| 4,566,127 A * | 1/1986 | Sekiya et al. ............ 382/175 |
| 4,710,951 A * | 12/1987 | Itezono ............... 379/100.14 |
| 5,812,818 A * | 9/1998 | Adler et al. ............... 703/23 |
| 5,917,615 A * | 6/1999 | Reifman et al. ............ 358/468 |
| 6,658,456 B1 * | 12/2003 | Shimoosawa ............ 709/206 |
| 2002/0036797 A1 * | 3/2002 | Yamamoto .............. 358/1.15 |
| 2003/0107758 A1 * | 6/2003 | Fujiwara ................ 358/1.15 |
| 2003/0128387 A1 * | 7/2003 | Noda .................... 358/1.15 |

FOREIGN PATENT DOCUMENTS

JP    2001-265699    9/2001

\* cited by examiner

*Primary Examiner*—Kimberly A. Williams
(74) *Attorney, Agent, or Firm*—Gerald E. Hespos; Anthony J. Casella

(57) ABSTRACT

When a facsimile data is received, a control unit causes the content of the facsimile data to be displayed on a display. The control unit causes a recording unit to print the content of the facsimile data on a recording sheet when a "Print" key is pressed down with the facsimile data displayed on the display while causing a forwarding method selection screen to be displayed on the display when a "To Forward" key is pressed down. The control unit causes a display urging the selection of the E-mail transmission of the received facsimile data, the transmission thereof to another computer and the transmission thereof to another facsimile apparatus to be displayed in the forwarding method selection screen on the display, and the facsimile data is forwarded by a forwarding method corresponding to the instruction given from an operator.

15 Claims, 15 Drawing Sheets

FACSIMILE APPARATUS

BACKGROUND OF THE INVENTION

1. Field of the Invention

The present invention relates to a facsimile apparatus capable of further forwarding a facsimile data received from an external communication line to network-connected computers and the like.

2. Description of the Related Art

There have been conventionally known network facsimile apparatus provided with a facsimile communication function of transmitting and receiving image information via a telephone line and a network communication function of transmitting and receiving image information to and from client terminal units via a local area network. With this network facsimile apparatus, the image information received via the telephone line can be transmitted to the client terminal units connected with the local area network.

In the above network facsimile apparatus, in the case of transferring the facsimile data received via the telephone line to the client terminal unit, the content of the received facsimile data is confirmed; a receiver of this facsimile data is confirmed; and this data is transferred to the client terminal unit used by this receiver. However, in the case of transferring the facsimile data in this way, an operator can neither confirm the content of the facsimile data nor judge the transferring end of the facsimile data unless the received facsimile data is printed (outputted) on a recording sheet upon receiving the facsimile data.

SUMMARY OF THE INVENTION

In view of the above problem residing in the prior art, an object of the present invention is to provide a facsimile apparatus which enables an operator to judge a transfer end of a facsimile data and to transfer the facsimile data by a simple operation without outputting the content of the received facsimile data on a recording sheet.

The present invention is directed to a facsimile apparatus, comprising:

- a transmitting/receiving unit to transmitting and receive a facsimile data via an external communication line,
- an output unit to output the facsimile data received by the transmitting/receiving unit,
- a display to display the facsimile data received by the transmitting/receiving unit,
- a forwarding unit to forward the facsimile data displayed on the display to another equipment,
- an instruction receiving unit to receive an instruction to output or forward the facsimile data displayed on the display by means of an external operation,
- a forwarding-end presenting unit to present the selection of a forwarding end, to which the facsimile data displayed on the display is to be forwarded, to an operator when the forwarding instruction is received by the instruction receiving unit,
- a forwarding-end receiving unit to receive the forwarding end given by an external operation after the forwarding end is presented by the forwarding-end presenting unit, and
- a control unit to cause the forwarding unit to forward the facsimile data displayed on the display to the received forwarding end if the forwarding-end receiving unit receives the forwarding end while causing the output unit to output the facsimile data displayed on the display if the instruction receiving unit receives the output instruction.

With the facsimile apparatus thus constructed, since the content of the received facsimile data is displayed on the display means, an operator can easily judge the forwarding end of this facsimile data without outputting the facsimile data to the recording sheet by seeing the content of the facsimile data displayed on the display means. Further, since the received facsimile data is either outputted or forwarded based on the instruction received by the instruction receiving means, the operator can easily select whether to output the received facsimile data or to forward it. Furthermore, since the facsimile data is forwarded to the forwarding end received by the forwarding-end receiving means after the forwarding end is presented by the forwarding-end presenting means in the case of forwarding the facsimile data, the operator can easily input the forwarding end.

DESCRIPTION OF THE PREFERRED EMBODIMENTS

Figure 1:
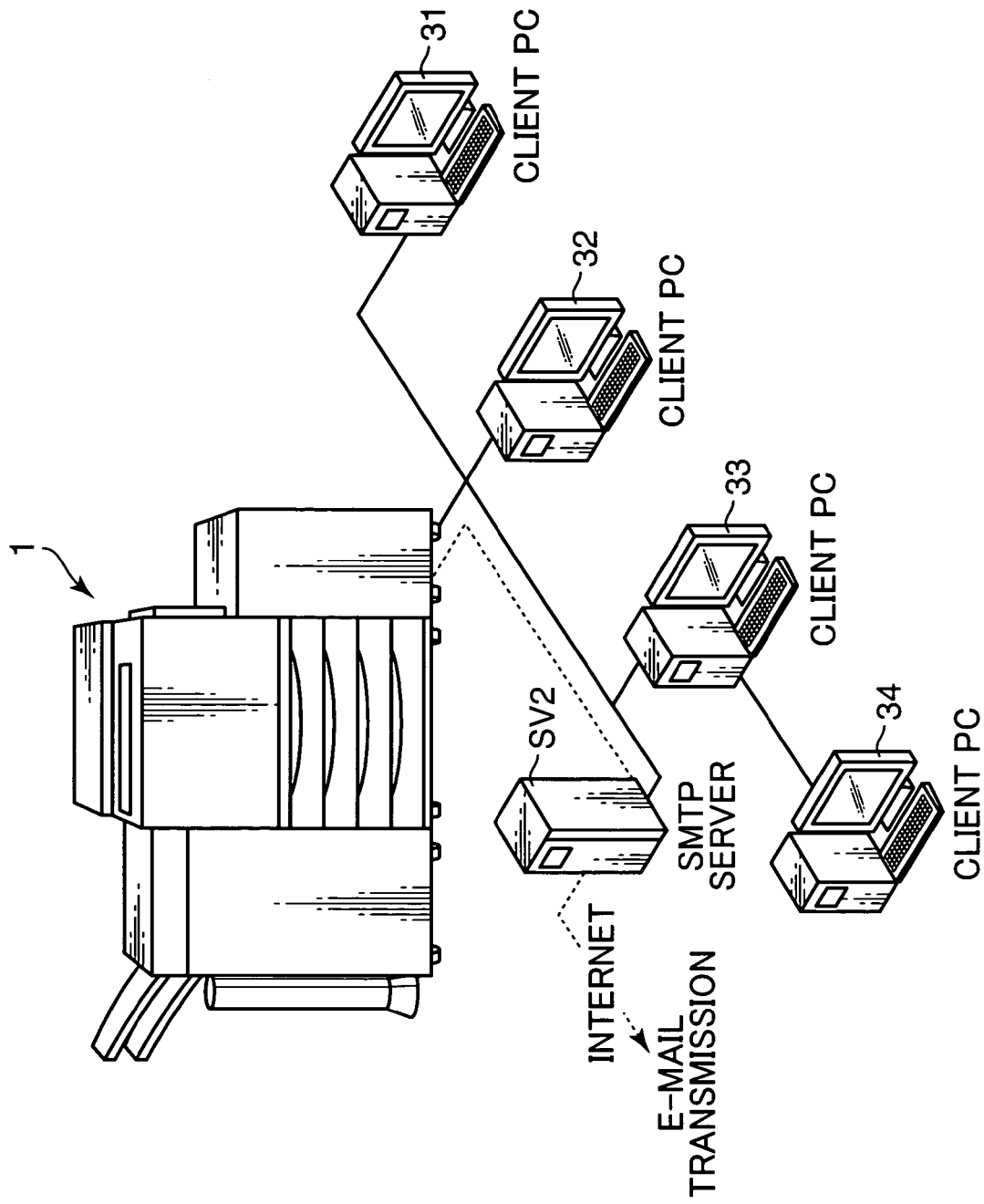
FIG. 1 is a perspective view showing a network construction comprised of a composite apparatus as one embodiment of a facsimile apparatus according to the present invention and computers connected with this composite apparatus.

Hereinafter, a facsimile apparatus according to the first embodiment of the present invention is described with reference to the accompanying drawings. FIG. 1 is a perspective view showing a network construction comprised of a composite apparatus as one embodiment of the facsimile apparatus according to the present invention and computers connected with this composite apparatus.

A composite apparatus 1 as one example of the facsimile apparatus is provided with a facsimile function, a copier function, a printer function, a scanner function and other functions. The composite apparatus 1 is also provided with a function of saving a data received by its facsimile function in an internal storage device and transmitting this received data to folders (parts of storages) in a SMTP server SV2 and personal computers (PC; client computer units) 31 to 34 network-connected with the composite apparatus 1 via Intranet or the like. It should be noted that data can be directly transmitted from the composite apparatus 1 to the respective PCs 31 to 34.

The network comprised of the composite apparatus 1, the SMTP server SV2 and the respective PCs 31 to 34 is connected with an external Internet network via the SMTP server SV2 to enable the reception and transmission of electronic mails. Thus, the composite apparatus 1 has a function of transmitting a data received by its facsimile function to Internet-connected computers via the SMTP server SV2.

Figure 2:
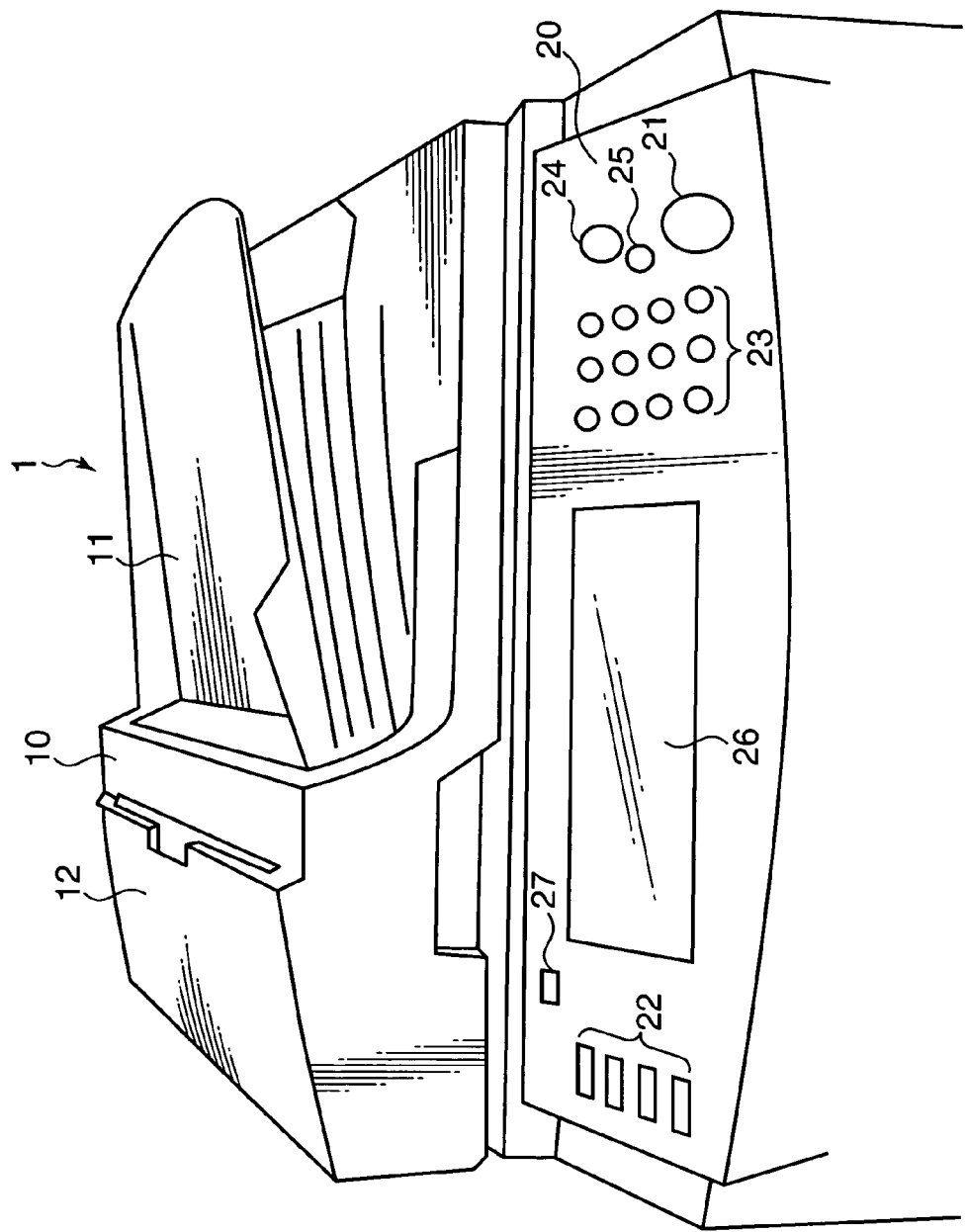
FIG. 2 is a diagram partly showing the external configuration of the composite apparatus.

FIG. 2 is a diagram partly showing the external configuration of the composite apparatus 1. Atop the composite apparatus 1, an automatic document feeder 10 for successively reading images of documents in the case of using the composite apparatus 1 as a facsimile or a copier is openably and closably provided on a glass document platen of a scanner unit (not shown). Further, an operation section 20 in which various switches used to operate this composite apparatus 1 are arrayed is provided at the front side of the top of the composite apparatus 1.

When documents are placed on a document loading section 11 of the automatic document feeder 10 and a start key 21 of the operation section 20 is pressed, they are successively fed from the document loading section 11 to the inside of the automatic document feeder 10 by means of a roller and the like provided in a driving section 12 of the automatic document feeder 10, are conveyed to a document table of the scanner unit, have their images read as image data line by line along a direction (main scanning direction) normal to a document conveying direction by means of sensing elements (line sensors) such as CCDs.

The scanner unit includes an optical system of a so-called mirror scan type. In the case of reading images of documents using the automatic document feeder 10, the images of the documents passing a specified position on the document platen are read with the mirror fixed. On the other hand, in the case of directly placing a document on the document platen without using the automatic document feeder 10, the mirror is driven in an auxiliary scanning direction normal to the main scanning direction below the document platen to read the image of the document. It should be noted that the scanner can be singly used as a scanner as a peripheral device of personal computers and can transmit the read image data to the personal computers connected via a LAN.

A recording unit (not shown due to its known construction) having a construction, for example, similar to a laser beam printer is provided in a main body of the composite apparatus 1. In the case of facsimile transmission by means of the composite apparatus 1, an image data read by the scanner unit is converted into a data format for the transmission and transmitted to another facsimile apparatus via a public telephone line. Further, in the case of facsimile reception by means of the composite apparatus 1, the recording unit records a facsimile data (image data) received via the public telephone line on a recording sheet and outputs a facsimile document. The recording sheet after the image formation is discharged onto a discharge tray provided at the outer side of the apparatus.

In the case of using this composite apparatus 1 as a copier, the recording unit forms an image on a recording sheet based on an image data read by the scanner unit, thereby realizing a copy output. Further, in the case of using this composite apparatus 1 as a network printer, the recording unit form images on recording sheets based on print data such as text data or image data transmitted from the PCs 31 to 34.

Since the composite apparatus 1 has a plurality of functions as described above, the operation section 20 includes in addition to the above start key 21, a function selection key 22 for selecting any of the functions as a facsimile, a copier, a printer and a scanner; a tenkey 23 for the input of the number of copies to be made or a facsimile number; a reset key 24 for clearing an erroneous input; a stop key 25 for stopping the facsimile transmission and the printing operation; a display 26 such as a liquid crystal display that serves both as a display device for displaying various selectable functions and an input device (touch panel) for the function selection; and a job-list display key 27 for displaying a list of, e.g. information on the received facsimile data on the display 26.

Figure 3:
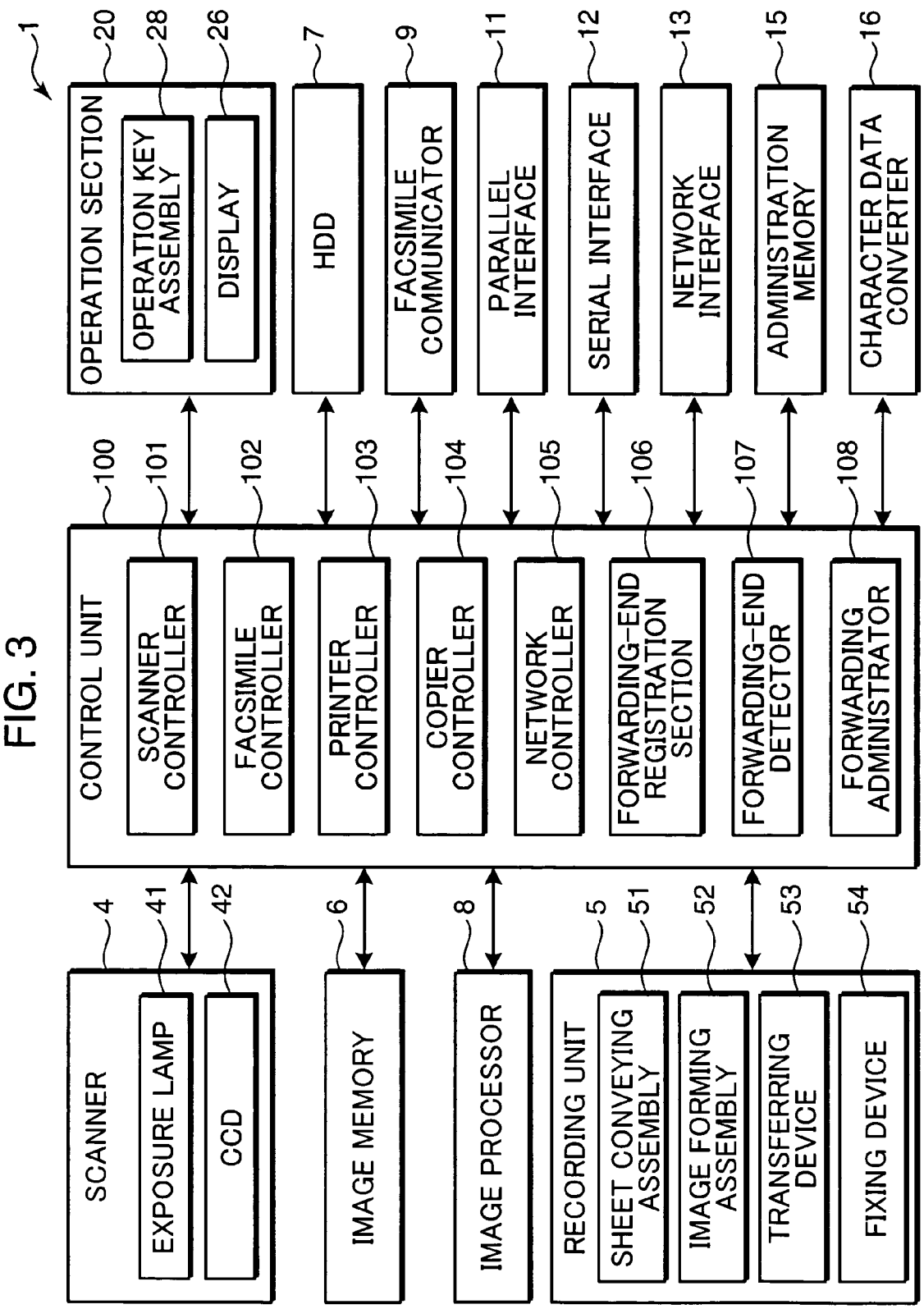
FIG. 3 is a function block diagram showing a schematic construction of the composite apparatus.

FIG. 3 is a function block diagram showing a schematic construction of the composite apparatus 1. The composite apparatus 1 is provided with a control unit 100 for controlling the overall operation of the entire apparatus. To this control unit 100 are connected the scanner unit 4 capable of reading document images and comprised of an exposure lamp 41 and CCDs 42; and the recording unit 5 comprised of a sheet conveying assembly 51, an image forming assembly 52 including a photosensitive drum and a developing device, a transferring device 53, a fixing device 54 and the like. Further, an image memory 6 used as a work area, for example, for temporarily saving a text data read by the scanner unit 4 and a large-capacity HDD (internal storage device) 7 having such a storage capacity capable of saving a large document data are connected with the control unit 100.

An image processor 8 is adapted to, at the time of reading a document by means of the scanner unit 4, convert an analog image signal outputted from the scanner unit 4 into a digital image signal and then to convert the resulting digital image signal into a compressed image after the application of such an image processing as to improve the image quality. This compressed image is written in an image memory 6. The control unit 100 can save this compressed image written in the image memory 6 in the HDD 7 as a file data to be administered as a text. Further, at the time of printing a registered document, the file data compressed to be printed is read from the HDD 7 or the computer of the network and written in the image memory 6, and the image processor 8 expands the compressed file data and applies an image processing in conformity with an output state. For example, in the case of laser exposure, the file data is finally converted into an analog modulated laser signal. A printout is made in the recording unit 5 (image forming assembly 52) in accordance with this analog modulated signal.

The control unit 100 functions as a scanner controller 101, a facsimile controller 102, a copier controller 104, a printer controller 103 and a network controller 105 in order to control the respective functions executable by the composite apparatus 1.

The scanner controller 101 controls the operations of the respective parts necessary for the operation of the scanner unit 4. The facsimile controller 102 controls the operations of the respective parts necessary for the facsimile operation, and controls a facsimile communicator 9 for the adjustment of data necessary for the facsimile communication. The facsimile communicator 9 is provided with a network control unit (NCU) for controlling the connection of a telephone line with a communication-end facsimile as a data transmission/reception end. The copier controller 104 controls the operations of the respective parts necessary for the copying operation.

The printer controller 103 controls the operations of the respective parts necessary for the printing operation. To the printer controller 103 are connected a parallel interface 11 for connecting the printer controller 103 with an external equipment in such a manner as to enable the parallel transmission of data by simultaneously sending several bits using a plurality of signal lines, and a serial interface 12 for connecting the printer controller 103 with an external equipment in such a manner as to enable the serial transmission of data by successively sending the data bit by bit using a single signal line.

The network controller 105 controls the data transmission and reception between the composite apparatus 1 and the computers and the like of the network. The network controller 105 causes the composite apparatus 1 to transmit and receive data to and from the SMTP server SV2 and the respective PCs 31 to 34 of the network via a network interface 13.

The aforementioned operation section 20 is also controlled by the control unit 100. An operation key assembly 28 includes the start key 21, the tenkey 23, the reset key 24, the stop key 25, and the function selection key 22. An operator operates the operation section 29 to display the content of the received facsimile data, designate the forwarding end of the facsimile data, and the like.

An administration memory 15 is for saving administration information (text name, saved folder, text data amount, etc.), text codes and the like of text data saved in the HDD 7 and the computers of the network.

A character data converter 16 is for converting a facsimile data comprised of an image data received by the facsimile communicator 9 into a character data by an optical character reader (OCR) processing or the like.

The control unit 100 also functions as a forwarding-end registration section 106 in which forwarding ends (e.g. email addresses, names of folders and information on the positions of the folders of the computers of the network, and facsimile numbers) used upon forwarding the received facsimile data to other equipments, and as a forwarding-end detector 107 for detecting whether or not the facsimile data converted into the character data by the character data converter 16 includes a string indicating the forwarding end saved in the forwarding-end registration section 106.

The control unit 100 further functions as a forwarding administrator 108 for executing various controls necessary to forward the facsimile data such as the control of the facsimile controller 102 and the network controller 105 in order to forward the facsimile data received by the facsimile communicator 9 or the facsimile data converted into the character data by the character data converter 16 to the forwarding end inputted by means of the operation section 20 or the one detected by the forwarding-end detector 107.

Figure 4:
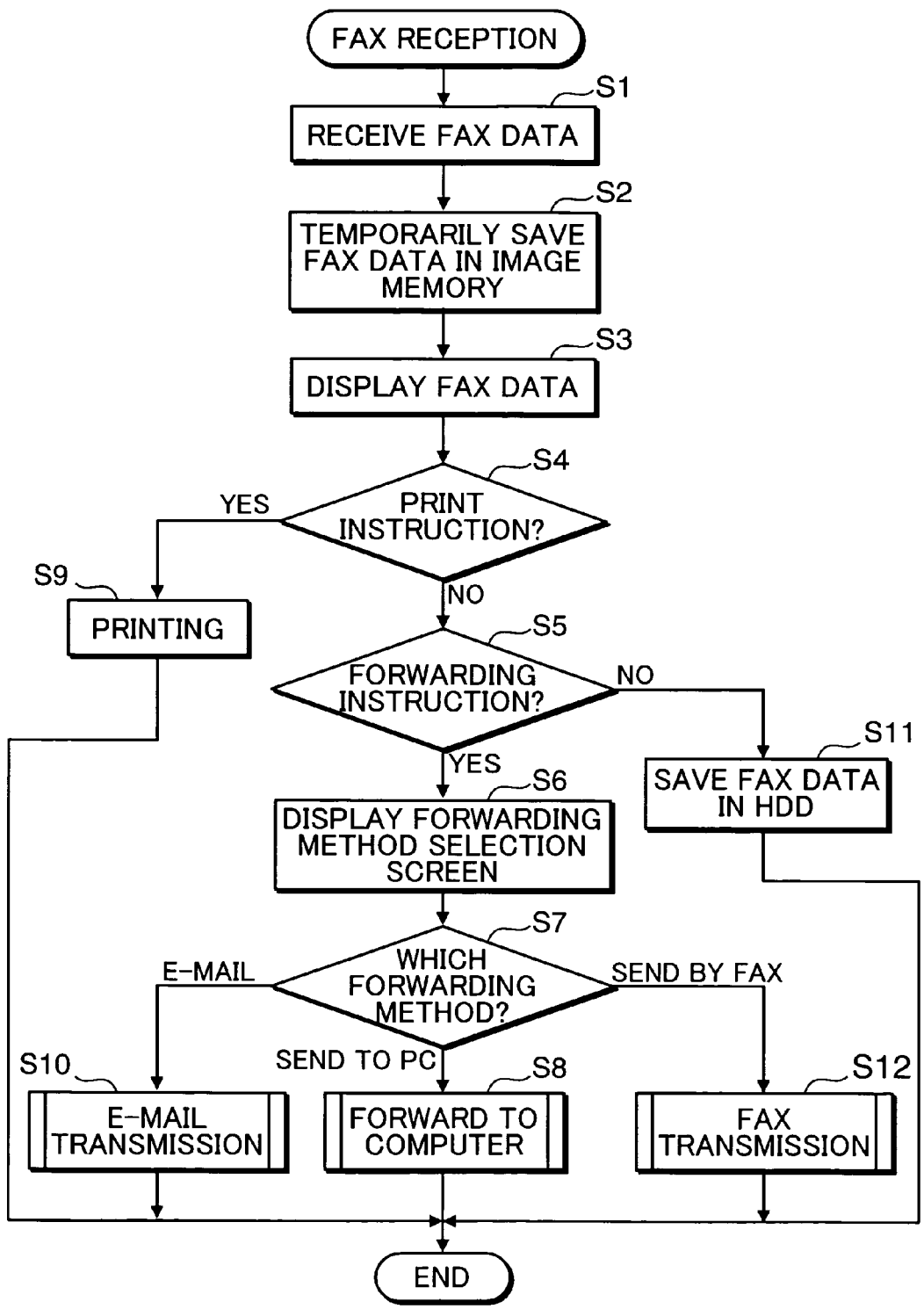
FIG. 4 is a flow chart showing a process of forwarding a received facsimile data to other apparatuses by the composite apparatus.

A process of forwarding the received facsimile data to another equipment by the composite apparatus 1 is described. FIG. 4 is a flow chart showing this process, FIG. 5 is a diagram showing a facsimile data display screen, and FIG. 6 is a forwarding method selection screen.

Figure 5:
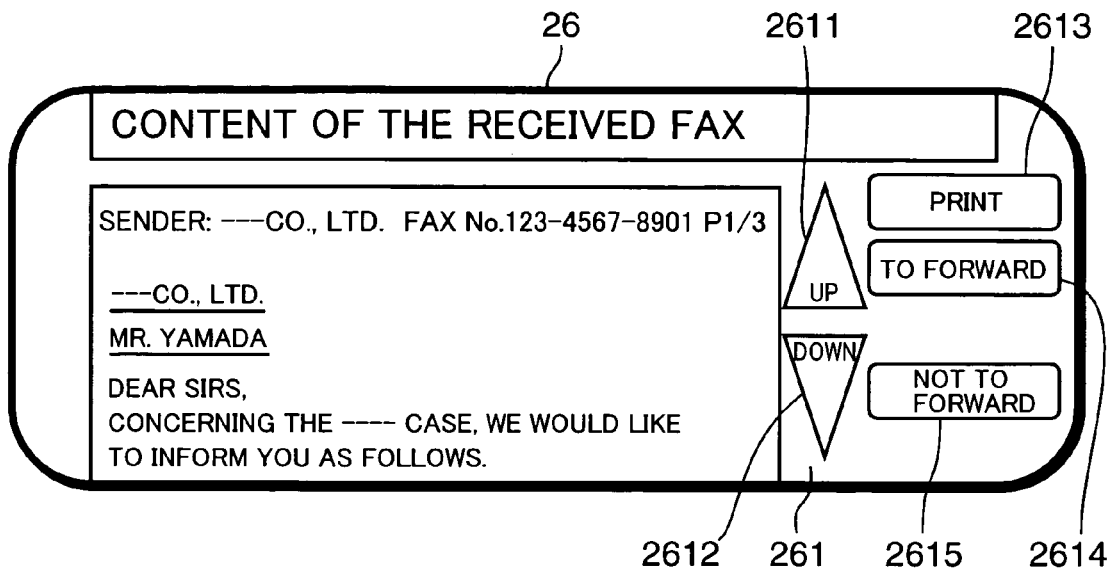
FIG. 5 is a diagram showing a facsimile data display screen.
Figure 6:
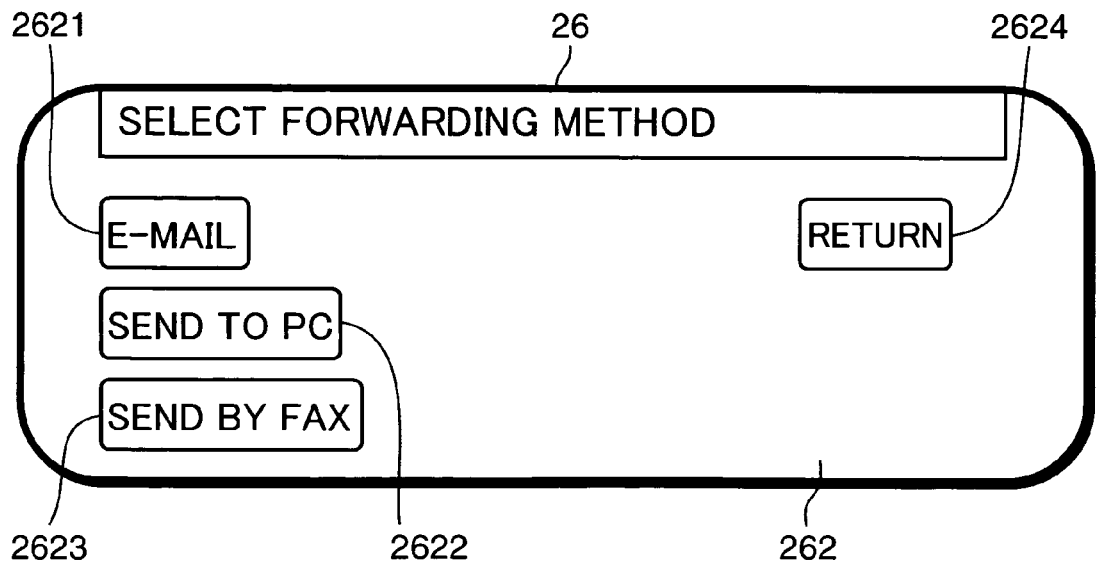
FIG. 6 is a diagram showing a forwarding method selection screen.

When the composite apparatus 1 receives a facsimile data from an external communication line (Step S1), the control unit 100 causes this facsimile data to be temporarily saved in the image memory 6 (Step S2) and causes the content thereof to be displayed on the display 26 (Step S3, see FIG. 5). As shown in FIG. 5, the content of the received facsimile data, up and down keys 2611, 2612 for scrolling up and down the content of the facsimile data, a "Print" button 2613, a "To Forward" button 2614, a "Not to Forward" button 2615 are displayed in a facsimile data display screen 261 on the display 26, whereby the operator is urged to input an instruction as to whether the received facsimile data is to be printed (outputted) or to be forwarded.

If the "Print" button 2613 is pressed down in the facsimile data display screen 261 and this instruction is received by the operation section 20 (YES in Step S4), the control unit 100 causes the recording unit 5 to print the content of the facsimile data on a recording sheet (Step S9).

If the "Not to Forward" button 2615 is pressed down in the facsimile data display screen 261 and this instruction is received by the operation section 20 (NO in Steps S4 and S5), the control unit 100 ends this process after the facsimile data is saved in the HDD 7 in the composite apparatus 1 (Step S11). After the facsimile data is saved in the HDD 7, the operator can freely print or forward the facsimile data by calling it from the HDD 7 on occasion or erase it from the HDD 7.

If the "To Forward" button 2614 is pressed down in the facsimile data display screen 261 and this instruction is received by the operation section 20 (NO in Step S4 and YES in Step S5), the control unit 100 causes a forwarding method selection screen 262 to be displayed on the display 26 (Step S6, see FIG. 6). As shown in FIG. 6, an "E-Mail" button 2621, a "Send to PC" button 2622, a "Send by Fax" button 2623, a "Return" button 2624 are displayed in the forwarding method selection screen 262. If the "E-Mail" button 2621 is pressed down in this forwarding method selection screen 262 and this instruction is received by the operation section 20 (E-Mail in Step S7), the control unit 100 executes a processing of transmitting the received facsimile data via an electronic mail (Step S10).

If the "Send to PC" button 2622 is pressed down in this forwarding method selection screen 262 and this instruction is received by the operation section 20 (Send to PC in Step S7), the network controller 105 of the control unit 100 executes a processing of forwarding the received facsimile data to the SMTP server SV2 and the PCs 31 to 34 network-connected with the composite apparatus 1 (Step S8). If the "Send by Fax" button 2623 is pressed down in this forwarding method selection screen 262 and this instruction is received by the operation section 20 (Send by Fax in Step S7), the facsimile controller 102 of the control unit 100 executes a processing of further transmitting the received facsimile data to another facsimile apparatus via the public line (Step S12). It should be noted that the control unit 100 causes the facsimile data display screen 261 to be displayed on the display 26 when the "Return" button 2624 is pressed down in the forwarding method selection screen 262 (not shown in FIG. 4).

Figure 7:
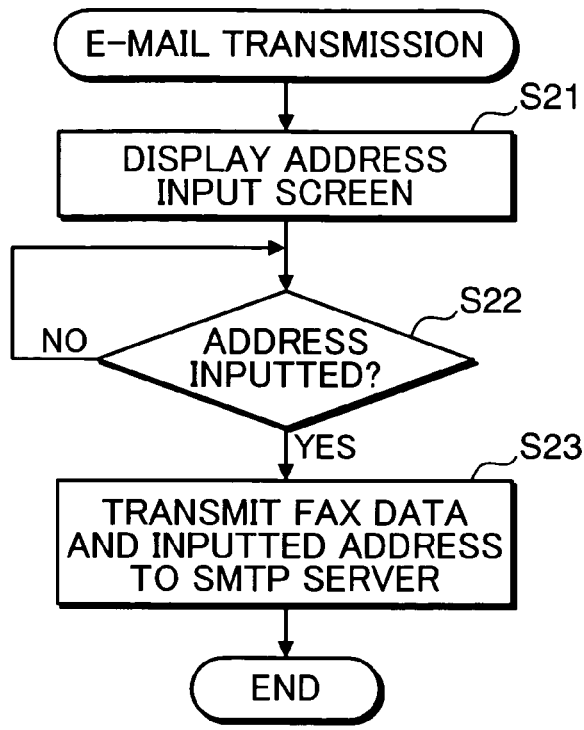
FIG. 7 is a flow chart showing a processing of transmitting the received facsimile data via an electronic mail.
Figure 8:
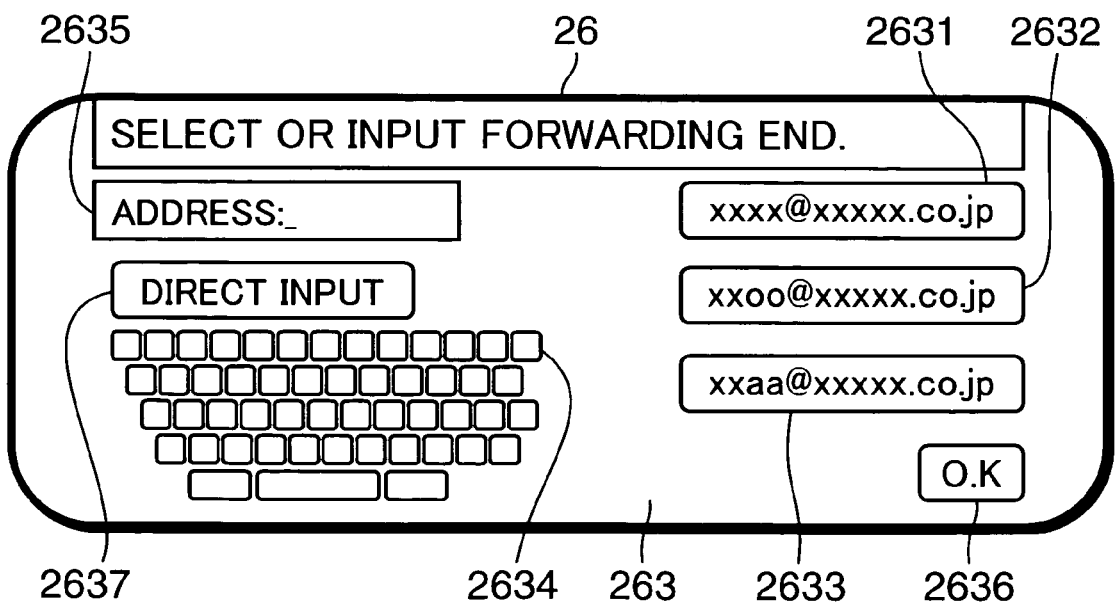
FIG. 8 is a diagram showing an address input screen.

The processing of transmitting the received facsimile data via an electronic mail (Step S10 of FIG. 4) is described. FIG. 7 is a flow chart showing this processing, and FIG. 8 is a diagram showing an address input screen. If the "E-Mail" button 2621 is pressed down while the forwarding method selection screen 262 is displayed on the display 26, the control unit 100 executes an electronic mail transmission processing, whereby an address input screen 263 is displayed on the display 26 (Step S21). Buttons 2631, 2632, 2633 showing transmission-end addresses already registered and alphanumeric keyboard buttons 2634 are displayed in the address input screen 263. When the input of the E-mail address of the transmission end by the operator is received by the operation section 20 by pressing an "OK" button 2636 down after pressing the transmission-end address button 2631, 2632, 2633 or pressing a "Direct Input" button 2637 and then directly inputting an address by means of the keyboard buttons 2634 in the address input screen 263, using a touch panel function (YES in Step S22), the network controller 105 transmits the facsimile data together with the inputted address information to the SMTP server SV2 via the network interface 13 (Step S23). The facsimile data transmitted to the SMTP server SV2 is transmitted to the corresponding transmission-end address via Internet by the SMTP server SV2. At this time, a plurality of transmission-end addresses can be simultaneously selected.

Figure 9:
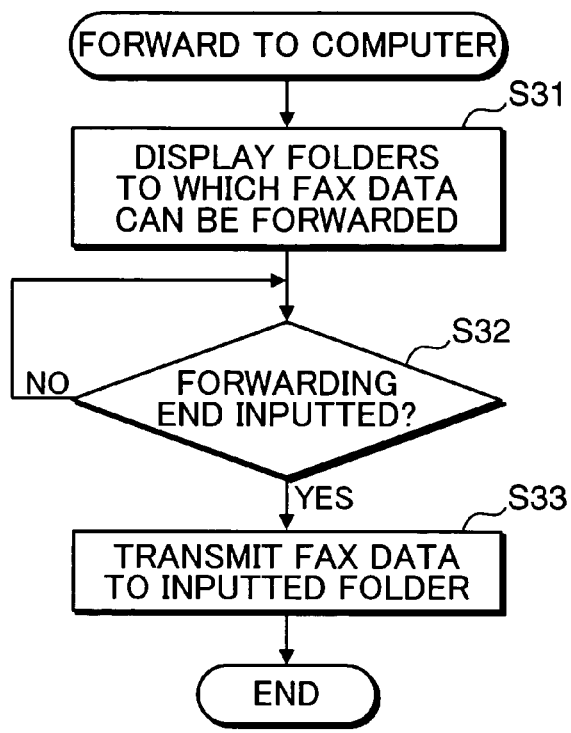
FIG. 9 is a flow chart showing a processing of forwarding the received facsimile data to the computer network-connected with the composite apparatus.
Figure 10:
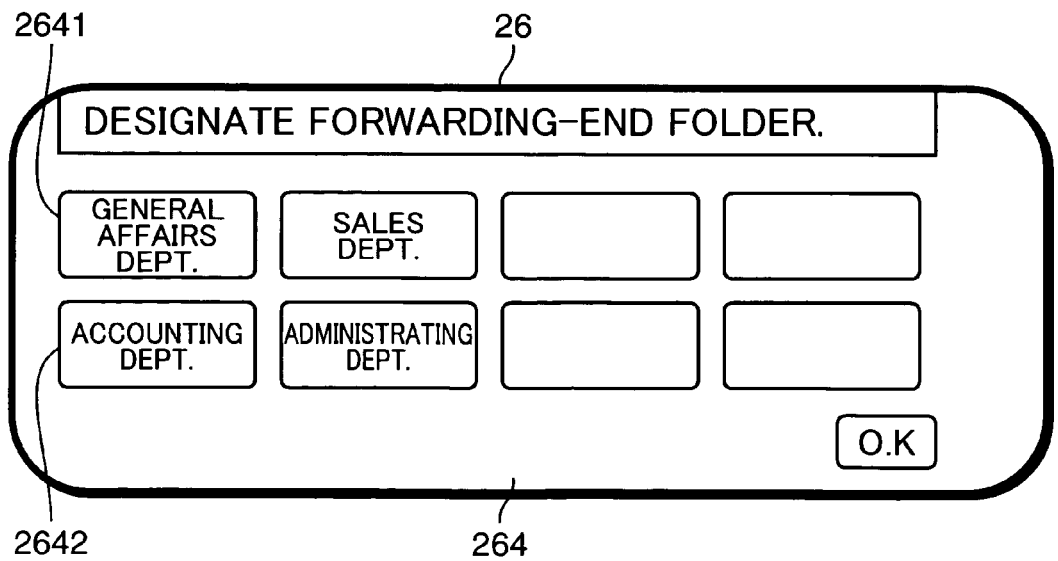
FIG. 10 is a diagram showing a forwarding-end folder input screen.

Next, the processing of forwarding the received facsimile data to the computer network-connected with the composite apparatus 1 is described. FIG. 9 is a flow chart showing this processing, and FIG. 10 is a diagram showing a forwarding-end folder input screen. If the "Send to PC" button 2622 is pressed down and this instruction is received by the operation section 20 with the forwarding method selection screen 262 displayed on the display 26, the control unit 100 starts a computer forwarding processing and causes a forwarding-end folder input screen 264 to be displayed on the display 26 (Step S31, see FIG. 10). As shown in FIG. 10, the names of folders (those already registered in the forwarding-end registration section 106) of the PCs 31 to 34 network-connected with the composite apparatus 1 and capable of data communication with the composite apparatus 1 are displayed in the forwarding-end folder input screen 264. If a button indicating the folder such as a "General Affairs Department" button 2641 or an "Accounting Department" button 2642 is pressed down in the forwarding-end folder input screen 264 and this input of the forwarding-end folder is received by the operation section 20 (YES in Step S32), the network controller 105 of the control unit 100 transmits the facsimile data to the PC having the inputted forwarding-end folder via the network interface 13 (Step S33).

Figure 11:
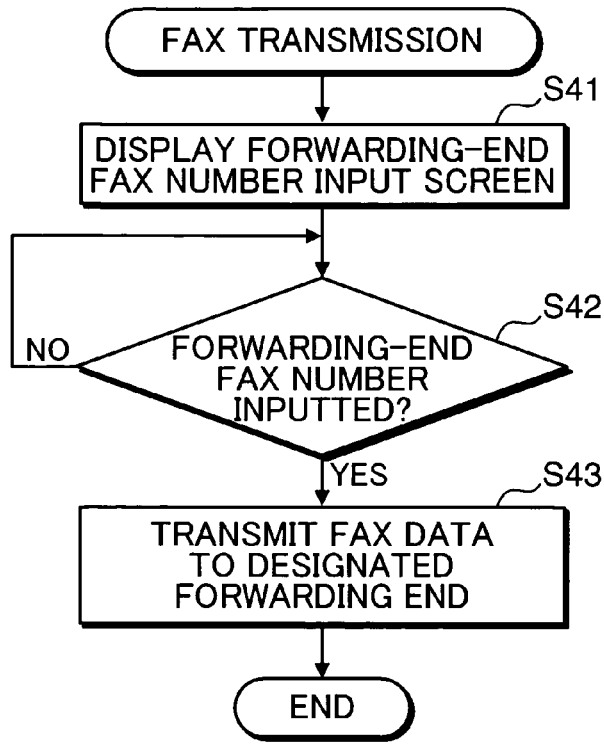
FIG. 11 is a flow chart showing a processing of further transmitting the received facsimile data to another facsimile apparatus via a public line.
Figure 12:
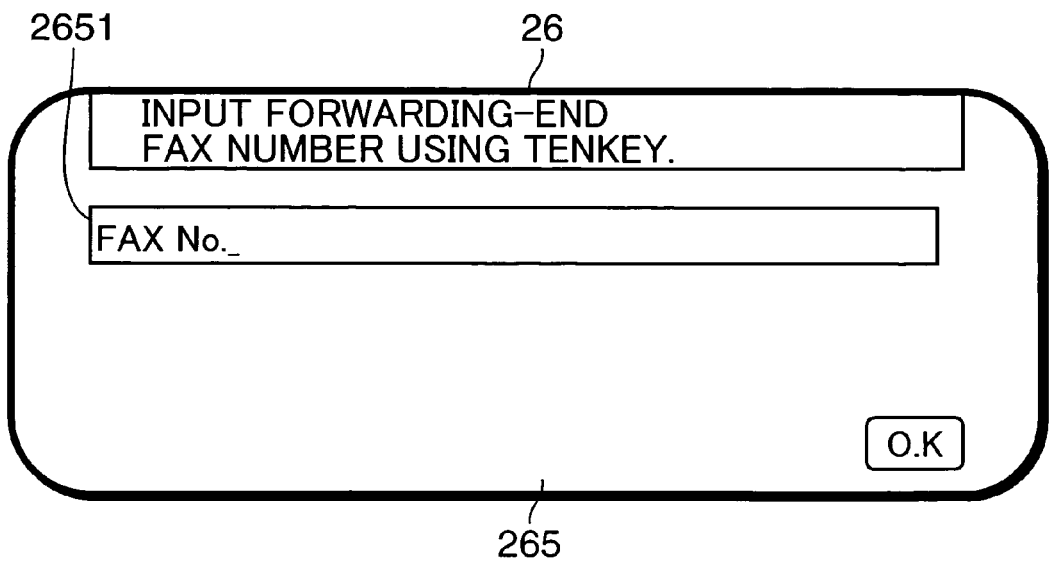
FIG. 12 is a diagram showing a transmission-end facsimile number input screen.

The processing of further transmitting the received facsimile data to another facsimile apparatus via the public line (Step S12 of FIG. 4) is described. FIG. 11 is a flow chart showing this processing and FIG. 12 is a diagram showing transmission-end facsimile number input screen. If the "Send by Fax" button 2623 is pressed down with the forwarding method selection screen 262 displayed on the display 26, the control unit 100 starts a facsimile transmission processing and causes a transmission-end facsimile number input screen 265 to be displayed on the display 26 (Step S41). A message urging the input of the transmission-end facsimile number is displayed in this transmission-end facsimile number input screen 265. If the input of the transmission-end facsimile number is received by the operation section 20 (YES in Step S42) while the transmission-end facsimile number input screen 265 is displayed, the facsimile controller 102 causes the facsimile communicator 9 to transmit the facsimile data to the facsimile apparatus having the inputted transmission-end facsimile number via the public line (Step S43). It should be noted that the inputted facsimile number is displayed in a facsimile number display list 2651.

As described above, according to the above process of the composite apparatus 1, the operator can easily judge the forwarding end of the facsimile data without printing the facsimile data on the recording sheet by seeing the facsimile data displayed on the display 26. Further, the operator can easily perform the operation of selecting whether to print or to forward the received facsimile data and the operation of inputting the forwarding end.

Figure 13:
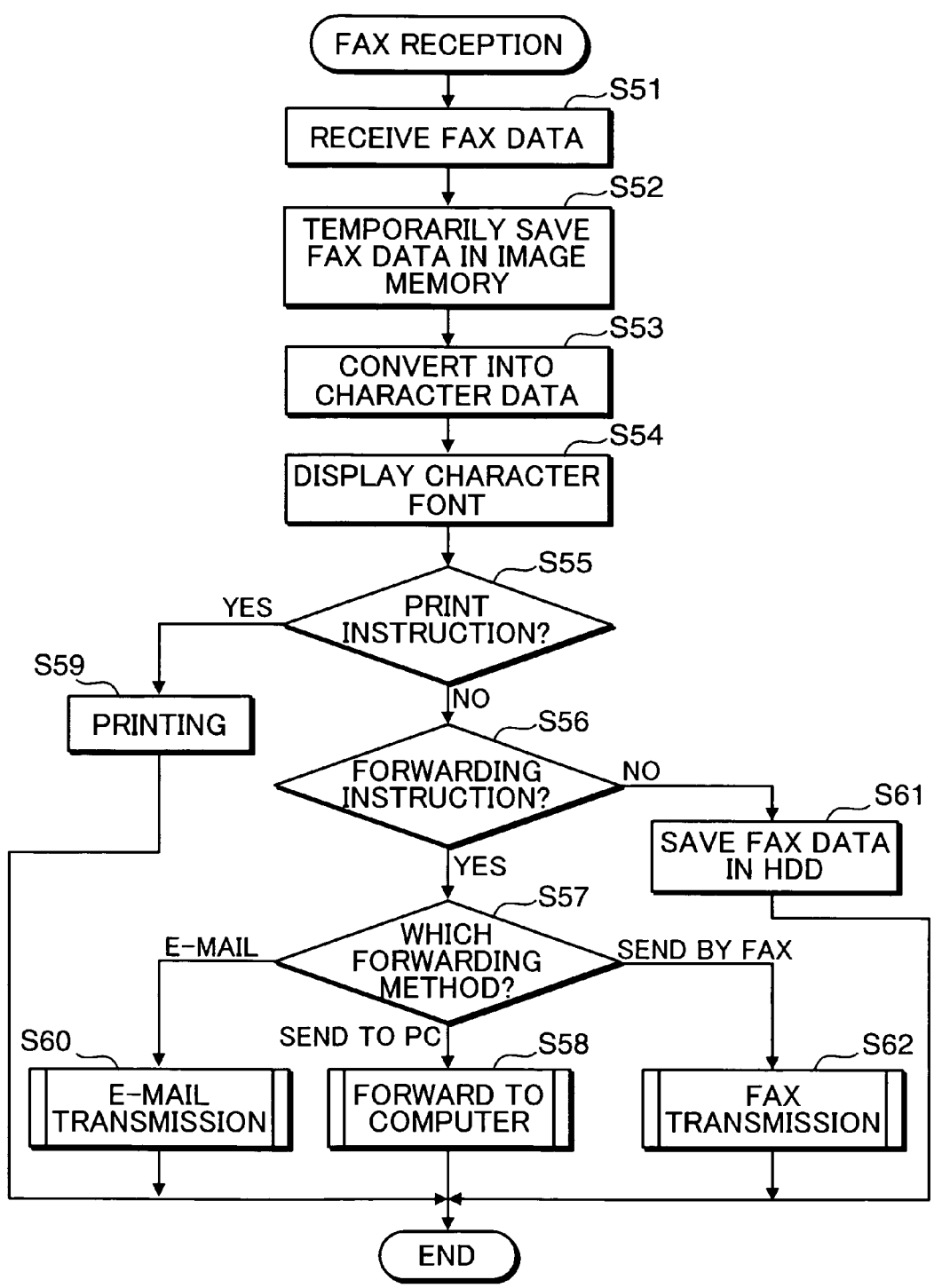
FIG. 13 is a flow chart showing the process of forwarding a received facsimile data to another computer or the like by the composite apparatus according to a second embodiment.

Next, a second embodiment of the processing of forwarding the received facsimile data to the other computers and the like by means of the composite apparatus 1 is described. FIG. 13 is a flow chart showing this process. It should be noted that operations similar to those of the first embodiment are not described here.

In the second embodiment, a received facsimile data is converted into a character data (e.g. text data) by the OCR processing of the character data converter 16 (Step S53). The control unit 100 causes the character data after the conversion to be displayed on the display 26 in a character font of the composite apparatus 1 (Step S54). In this way, the facsimile data is displayed in the character font after being converted into the character data, whereby an image having a higher resolution can be displayed on the display 26 as compared to a case where the received image data is displayed as it is. Therefore, the operator can more easily confirm the received data.

Also in the case of printing the content of this facsimile data (Step S59) after receiving a print instruction from the operator (YES in Step S55), a printing result of a higher quality can be obtained by using the character font. Since the data converted into the character data is saved in the HDD 7 in the composite apparatus 1 in the case of saving the facsimile data in the HDD 7 (NO in Step S56, S61), an amount of data to be saved can be reduced.

Figure 14:
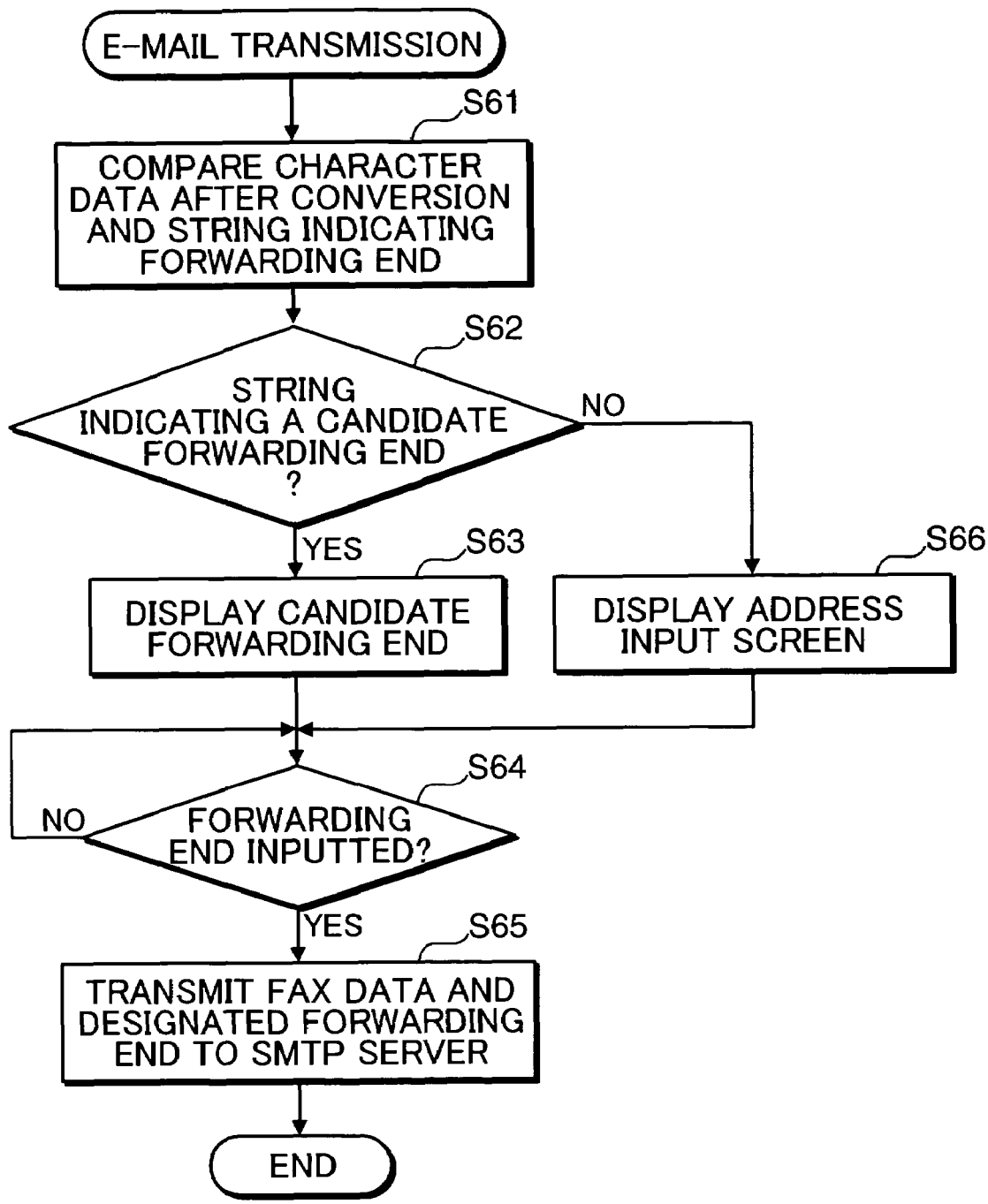
FIG. 14 is a flow chart showing a processing of transmitting the received facsimile data via an electronic mail according to the second embodiment.
Figure 15:
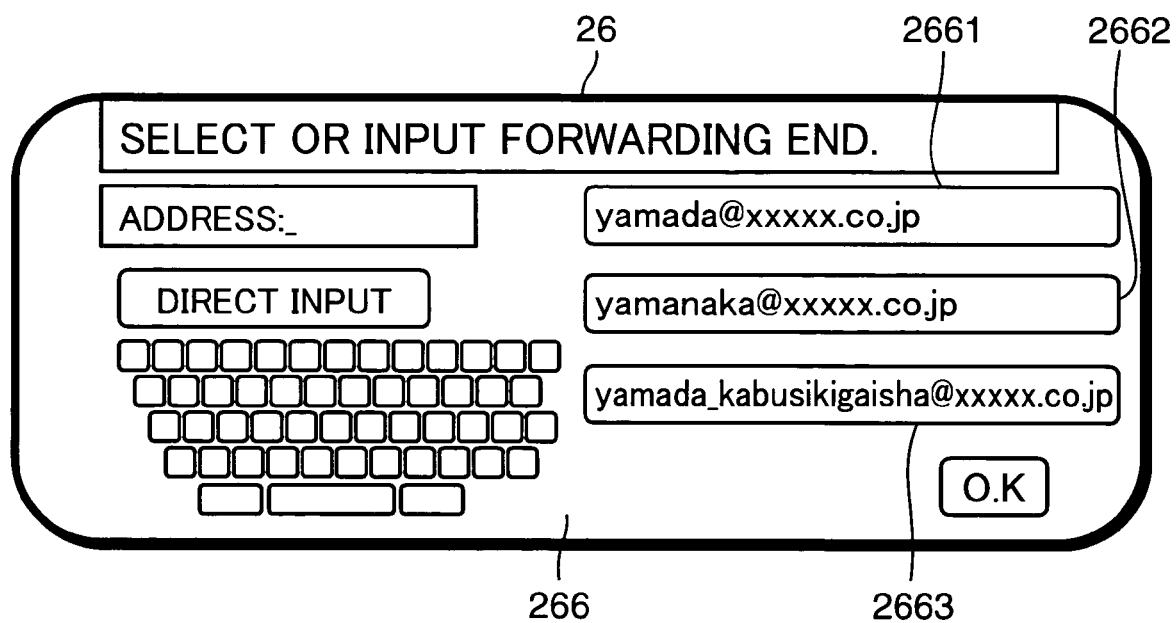
FIG. 15 is a diagram showing a candidate forwarding-end display screen.

Next, a processing of transmitting the received facsimile data via an electronic mail (Step S60 of FIG. 13) according to the process of the second embodiment is described. FIG. 14 is a flow chart showing this processing, and FIG. 15 is a diagram showing a candidate forwarding-end display screen. Upon executing an electronic-mail transmission processing according to the second embodiment, the forwarding-end detector 107 compares the character data obtained by converting the facsimile data and the strings indicating the forwarding ends and registered in the forwarding-end registration section 106 (Step S61), thereby detecting whether or not the character data obtained by converting the facsimile data includes the string indicating the forwarding end. If the character data obtained by converting the facsimile data includes the string indicating the forwarding end (YES in Step S62), the control unit 100 reads the candidate forwarding end from the forwarding-end registration section 106 and causes them to be displayed on the display 26 as a candidate forwarding-end address input screen 266 (Step S63).

For example, if the names (e.g. Yamada) and addresses (e.g. yamada@xxxxx.co.jp) of the receivers are registered as forwarding ends in the forwarding-end registration section 106, whether or not the character data after the conversion includes the string such as "Yamada" or "yamada@xxxxx.co.jp" is detected by the forwarding-end detector 107. If this string is detected, an address button 2661 "yamada@xxxxx.co.jp" which is so registered in the forwarding-end registration section 106 as to correspond to "Yamada" is displayed as shown in FIG. 15. It should be noted that the detector 107 may also detect whether the registered names and addresses written in Chinese characters and Japanese cursive characters are included in the character data or not.

If the names similar to the characters "Yamada" such as "Yamanaka", "Yamaguchi" and "Yamada Co., Ltd." are registered in the forwarding-end registration section 106, then, in view of a possibility of an erroneous conversion at the time of converting the facsimile data into the character data (during the OCR processing), the control unit 100 reads the addresses registered in correspondence with these names from the forwarding-end registration section 106 and causes address buttons 2662, 2663 showing these addresses to be also displayed.

If the forwarding-end detector 107 judges that the character data after the conversion does not include the string indicating the forwarding end (NO in Step S62), the control unit 100 causes an address input screen 263 (similar to the one according to the first embodiment shown in FIG. 8) comprised of the buttons 2631, 2632, 2633 showing the already registered forwarding-end addresses and the alphanumeric keyboard buttons 2634 to be displayed on the display 26 (Step S66).

Thereafter, when the operator inputs the electronic-mail address as the transmission end in the candidate transmission-end address input screen 266 or in the address input screen 263 and this input is received by the operation section 20 (YES in Step S64), the network controller 105 of the control unit 100 transmits the facsimile data converted into the character data to the SMTP server SV2 together with the inputted address information via the network interface 13 (Step S65). Then, the SMTP server SV2 transmits the facsimile data to the transmission-end address via Internet.

Figure 16:
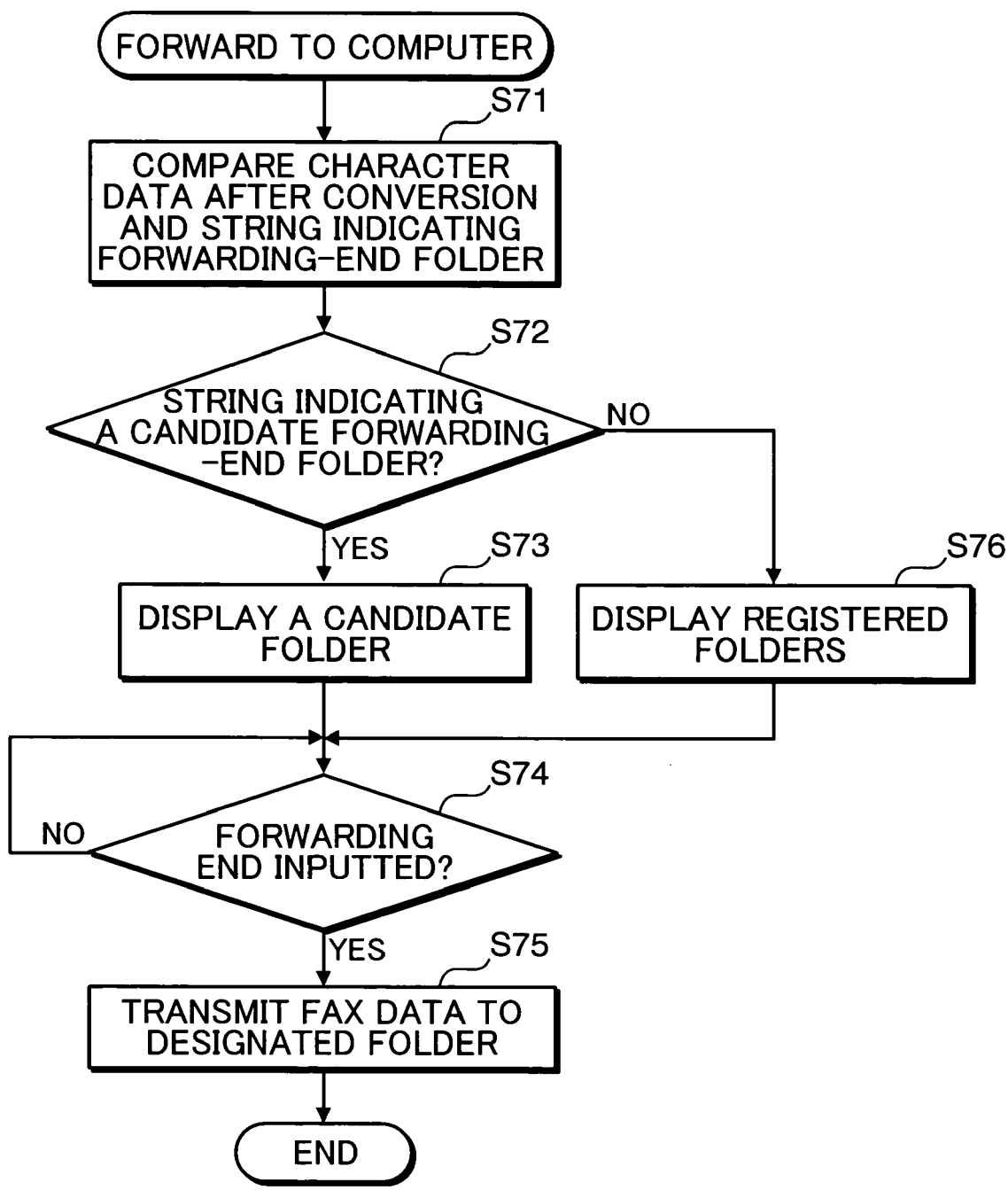
FIG. 16 is a flow chart showing a processing of forwarding the received facsimile data to the computer network-connected with the composite apparatus.
Figure 17:
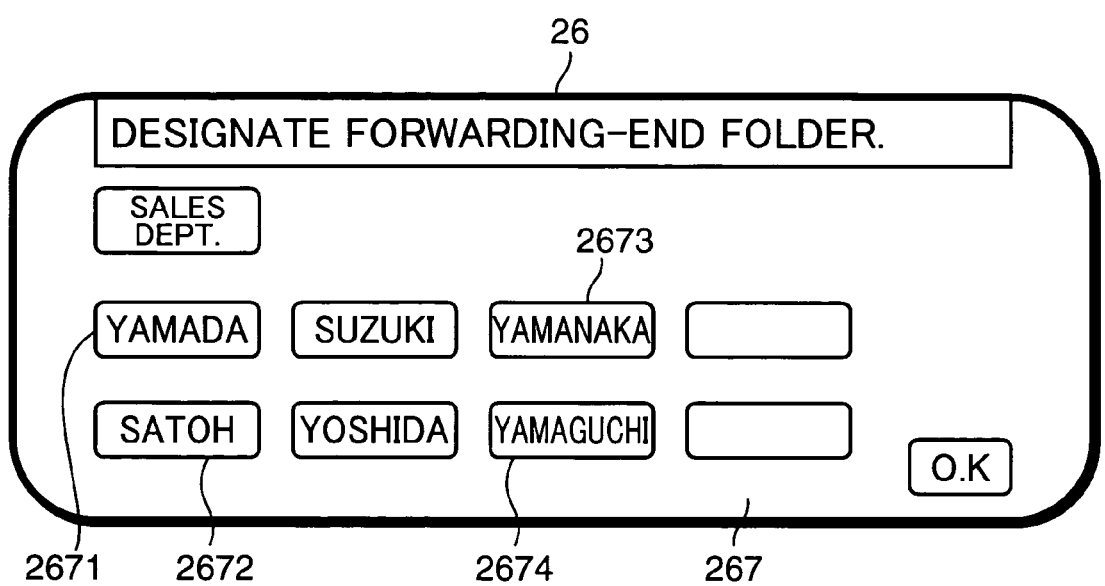
FIG. 17 is a diagram showing a candidate forwarding-end folder display screen.

Next, a processing of forwarding the received facsimile data to the computer network-connected with the composite apparatus 1 (Step S58) in the process according to the second embodiment is described. FIG. 16 is a flow chart showing this processing, and FIG. 17 is a diagram showing a candidate forwarding-end folder display screen. When a computer forwarding processing according to the second embodiment is started, the forwarding-end detector 107 compares the character data obtained by converting the facsimile data and the strings indicating the forwarding-end folders and registered in the forwarding-end registration section 106 (Step S71), thereby detecting whether or not the character data obtained by converting the facsimile data includes the string indicating the forwarding-end folder. If the forwarding-end detector 107 judges that the character data obtained by converting the facsimile data includes the string indicating the forwarding-end folder (YES in Step S72), the control unit 100 reads the candidate forwarding-end folder from the forwarding-end registration section 106 and causes a candidate forwarding-end folder input screen 267 to be displayed on the display 26 (Step S73).

For example, if a folder "Sales Department" is registered as the name of the forwarding-end folder in the forwarding-end registration section 106 and folders "Yamada", "Sato", etc. are registered in this folder "Sales Department", the forwarding-end detector 107 detects whether or not the character data after the conversion includes the string such as "Sales Department", "Yamada" or "Sato". If this character data includes such a string, the control unit 100 causes buttons 2671, 2672 indicating the folders "Yamada", "Sato" in the folder "Sales Department" to be displayed in the candidate forwarding-end folder input screen 267 on the display 26 as shown in FIG. 17.

If the names similar to the characters "Yamada" such as "Yamanaka" and "Yamaguchi" are registered in the forwarding-end registration section 106, then, in view of a possibility of an erroneous conversion at the time of converting the facsimile data into the character data (during the OCR processing), the control unit 100 causes buttons 2673, 2674 indicating the folders registered in correspondence with these names to be also displayed on the display 26.

Unless the forwarding-end detector 107 detects the string indicating the forwarding-end folder in the character data after the conversion (NO in Step S72), the control unit 100 causes a forwarding-end folder input screen 264 (similar to the one according to the first embodiment shown in FIG. 10) comprised of the buttons 2641, 2642 and the like indicating the already registered forwarding-end folders to be displayed on the display 26 (Step S76).

Thereafter, when the input of the forwarding-end folder is received in the candidate forwarding-end folder input screen 267 or the forwarding-end folder input screen 264 of the operation section 20 (YES in Step S74), the control unit 100 causes the network controller 105 to transmit the facsimile data converted into the character data to the inputted forwarding-end folder (Step S75).

Figure 18:
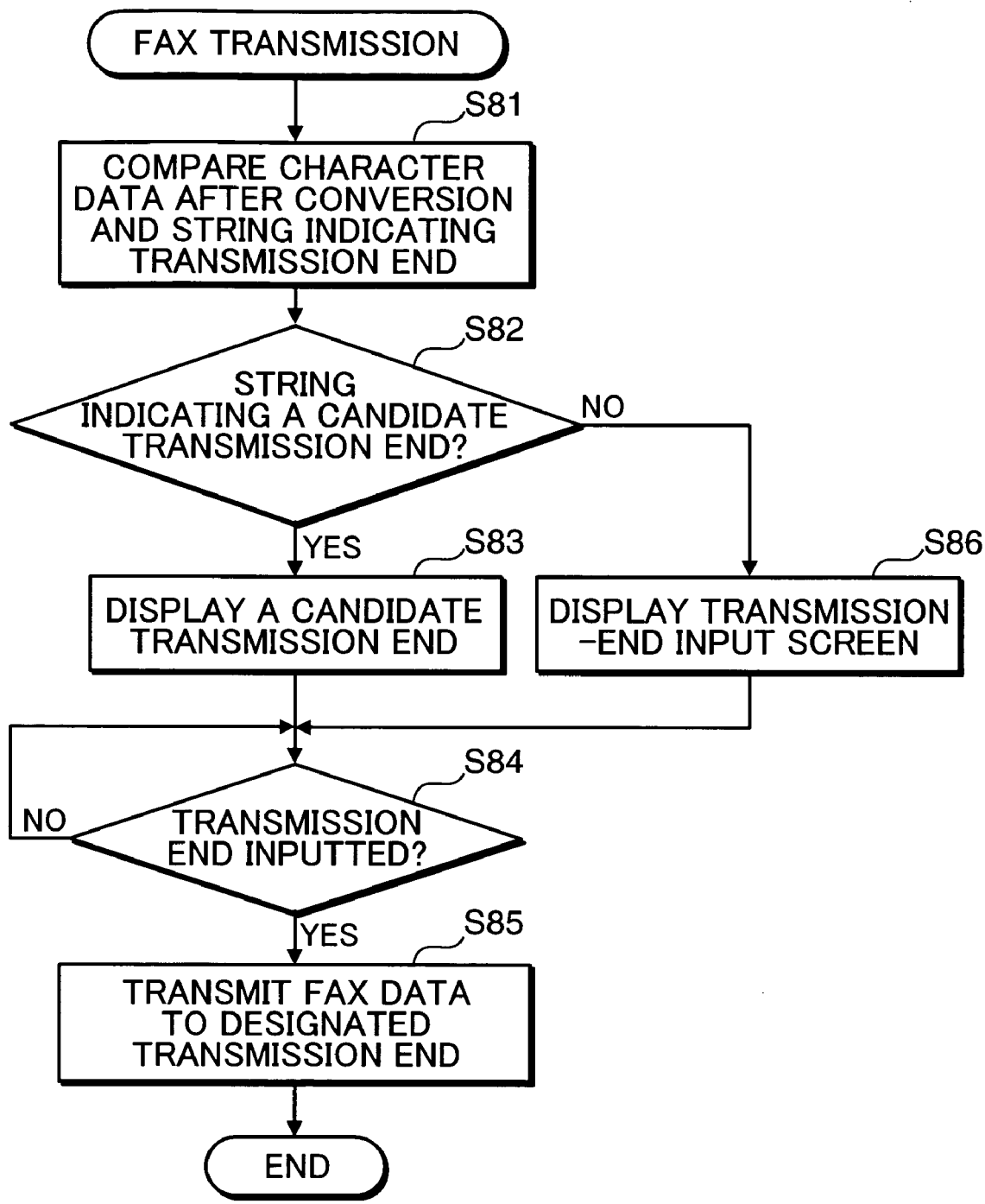
FIG. 18 is a flow chart showing a processing of further transmitting the received facsimile data to another facsimile apparatus via a public line according to the second embodiment.
Figure 19:
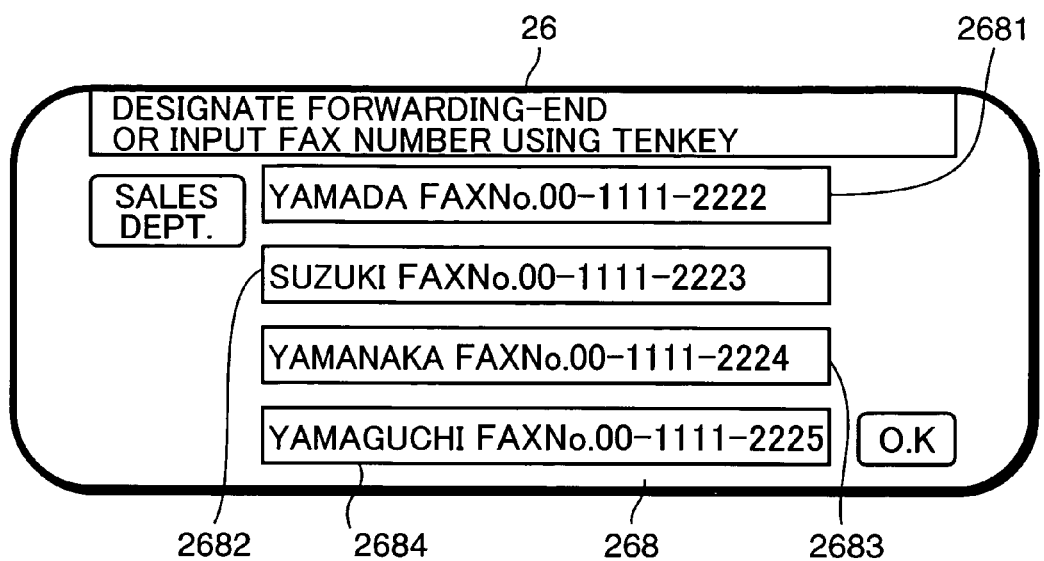
FIG. 19 is a diagram showing a candidate facsimile number input screen.

Next, the processing of further transmitting the received facsimile data to another facsimile apparatus via the public line (Step S62 of FIG. 13) in the process according to the second embodiment is described. FIG. 18 is a flow chart showing this processing, and FIG. 19 is a diagram showing a candidate facsimile number input screen. Upon executing the facsimile transmission processing according to the second embodiment, the forwarding-end detector 107 compares the character data obtained by converting the facsimile data and the strings indicating the forwarding-end facsimile numbers and registered in the forwarding-end registration section 106 (Step S81), thereby detecting whether or not the character data obtained by converting the facsimile data includes the string indicating the forwarding-end facsimile number. If the forwarding-end detector 107 judges that the character data obtained by converting the facsimile data includes the string indicating the forwarding-end facsimile number (YES in Step S82), the control unit 100 reads the candidate forwarding end from the forwarding-end registration section 106 and causes a candidate facsimile number input screen 268 to be displayed on the display 26 (Step S83).

For example, if "Yamada", "Suzuki" and the like belonging to the "Sales Department" are registered as facsimile forwarding ends in the forwarding-end registration section 106, the forwarding-end detector 107 detects whether or not the character data after the conversion includes the string such as "Sales Department", "Yamada" or "Suzuki". If this character data after the conversion includes such a string, the control unit 100 causes buttons 2681, 2682 indicating the facsimile numbers of, e.g. "Yamada" and "Suzuki" belonging to the sales department to be displayed in the candidate facsimile number input screen 268 as shown in FIG. 19.

If the names similar to the characters "Yamada" such as "Yamanaka" and "Yamaguchi" are registered in the forwarding-end registration section 106, then, in view of a possibility of an erroneous conversion at the time of converting the facsimile data into the character data (during the OCR processing), the control unit 100 causes buttons 2683, 2684 indicating the facsimile numbers registered in correspondence with these names to be also displayed on the display 26.

If the forwarding-end detector 107 judges that the character data after the conversion does not include the string indicating the already registered facsimile forwarding end (NO in Step S82), the control unit 100 causes a forwarding-end facsimile number input screen 265 similar to the one shown in FIG. 12 to be displayed on the display 26 (Step S86).

Thereafter, when the forwarding-end facsimile number is inputted in the candidate facsimile number input screen 268 or in the transmission-end facsimile number input screen 265 and this input is received by the operation section 20 (YES in Step S84), the facsimile controller 102 causes the facsimile communicator 9 to transmit the facsimile data to the inputted forwarding-end facsimile number via the public line (Step S85).

As described above, according to the process of the second embodiment, the candidate forwarding end(s) is/are displayed and the facsimile data is transmitted to the forwarding end inputted by the operator if the string indicating the forwarding end is included in the character data obtained by converting the facsimile data. Thus, the forwarding end can be easily designated when the operator forwards the received facsimile data to the others.

The present invention is not limited to the foregoing embodiments, and various changes can be made. For example, in the second embodiment, the control unit 100 displays the candidate forwarding end on the display 26 and forwards the facsimile data upon receiving the input of the forwarding end by the operator if the character data obtained by converting the received facsimile data is detected by the forwarding-end detector 107 to include the string indicating the forwarding-end registered in the forwarding-end registration section 106. However, the facsimile data may be automatically forwarded to the detected candidate forwarding end without displaying the candidate forwarding end on the display 26 upon detecting the string indicating the forwarding end registered in the forwarding-end registration section 106 in the character data obtained by converting the facsimile data.

Further, in the second embodiment, the facsimile data converted into the character data may be forwarded to the forwarding end inputted by the operator without detecting whether or not the character data obtained by converting the received facsimile data includes the string indicating the forwarding end registered in the forwarding-end registration section 106, i.e. based only on the input of the forwarding end by the operator without executing any processing to search for the forwarding end as a candidate.

In the foregoing embodiments, the control unit 100 saves the facsimile data in the HDD 7 in the composite apparatus 1 if the operator gives neither the print instruction nor the forwarding instruction at the time of receiving the facsimile data (NO in Steps S4 and S5 of FIG. 4, NO in Steps S55 and S56 of FIG. 13). However, the process may be ended without saving the facsimile data in the HDD 7 in this case.

Further, in the foregoing embodiments, an electronic mail may be directly transmitted to computer(s) connected via Internet or the like without being transmitted via the SMTP server SV2 if the composite apparatus 1 is provided with an electronic mail transmitting function. Further, the received facsimile data may be transmitted in the form of an electronic mail from the composite apparatus 1 (or via the SMTP server SV2) to computer(s) on a local network or an intranet.

Furthermore, although the composite apparatus 1 having a copier function, a printer function and a facsimile function is described as the image forming apparatus according to the present invention in the foregoing embodiments, the inventive image forming apparatus is not limited thereto. The present invention is applied to any image forming apparatus provided that it has a facsimile function and a function necessary for the facsimile data forwarding.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A facsimile apparatus, comprising:
a transmitting/receiving unit to transmit and receive a facsimile data via an external communication line,
an output unit to output the facsimile data received by the transmitting/receiving unit,
a display to display the facsimile data received by the transmitting/receiving unit,
a forwarding unit to forward the facsimile data displayed on the display to another equipment,
an instruction receiving unit to receive an instruction to output or forward the facsimile data displayed on the display by means of an external operation,
a forwarding-end presenting unit to present the selection of a forwarding end, to which the facsimile data displayed on the display is to be forwarded, to an operator when the forwarding instruction is received by the instruction receiving unit,
a forwarding-end receiving unit to receive the forwarding end given by an external operation after the forwarding end is presented by the forwarding-end presenting unit,
a control unit to cause the forwarding unit to forward the facsimile data displayed on the display to the received forwarding end if the forwarding-end receiving unit receives the forwarding end, and to cause the output unit to output the facsimile data displayed on the display if the instruction receiving unit receives the output instruction,
a character-data converting unit to convert the facsimile data received by the transmitting/receiving unit into a character data, and
a forwarding-end detector to detect whether or not the facsimile data converted into the character data by the character-data converting unit includes a string indicating the forwarding end stored in the forwarding-end presenting unit,
wherein if the forwarding end is detected by the forwarding-end detector, the control unit causes the forwarding unit to forward the character data obtained by the conversion by the character-data converting unit to the forwarding end detected by the forwarding-end detector.

2. The facsimile apparatus according to claim 1, wherein the forwarding unit transfers the facsimile data displayed on the display to a folder in a computer network connected with the facsimile apparatus.

3. The facsimile apparatus according to claim 1, wherein the forwarding unit forwards the facsimile data displayed on the display to a computer network connected with the facsimile apparatus in order to enable the transmission in the form of an electronic mail.

4. The facsimile apparatus according to claim 1, wherein the forwarding unit transmits the facsimile data displayed on the display from the transmitting/receiving unit via an external communication line to another facsimile apparatus.

5. The facsimile apparatus according to claim 1, further comprising a storage unit to save the facsimile data received by the transmitting/receiving unit, wherein the control unit saves the facsimile data displayed on the display in the storage unit if the instruction receiving unit receives a saving instruction.

6. The facsimile apparatus according to claim 1, wherein the control unit causes the forwarding end detected by the forwarding-end detector to be displayed on the display and causes the forwarding unit to forward the character data obtained by the conversion of the facsimile data by the character-data converting unit to the forwarding end if the forwarding end displayed on the display is received by the forwarding-end receiving unit.

7. The facsimile apparatus according to claim 6, wherein the forwarding unit transfers the facsimile data displayed on the display to a folder in a computer network connected with the facsimile apparatus.

8. The facsimile apparatus according to claim 6, wherein the forwarding unit forwards the facsimile data displayed on the display to a computer network connected with the facsimile apparatus in order to enable the transmission in the form of an electronic mail.

9. The facsimile apparatus according to claim 6, wherein the forwarding unit transmits the facsimile data displayed on the display from the transmitting/receiving unit via an external communication line to another facsimile apparatus.

10. The facsimile apparatus according to claim 6, further comprising a storage unit to save the facsimile data received by the transmitting/receiving unit, wherein the control unit saves the facsimile data displayed on the display in the storage unit if the instruction receiving unit receives a saving instruction.

11. The facsimile apparatus according to claim 1, wherein the forwarding-end detector detects whether or not the character data obtained by the conversion of the facsimile data by the character-data converting unit includes a string indicating the forwarding end stored in the forwarding-end presenting unit or a string similar to the forwarding end stored in the forwarding-end presenting unit, and the control unit causes the forwarding end detected by the forwarding-end detector to be displayed on the display and causes the forwarding unit to forward the character data obtained by the conversion by the character-data converting unit to the forwarding end if the forwarding end displayed on the display is received by the forwarding-end receiving unit.

12. The facsimile apparatus according to claim 11, wherein the forwarding unit transfers the facsimile data displayed on the display to a folder in a computer network connected with the facsimile apparatus.

13. The facsimile apparatus according to claim 11, wherein the forwarding unit forwards the facsimile data displayed on the display to a computer network connected with the facsimile apparatus in order to enable the transmission in the form of an electronic mail.

14. The facsimile apparatus according to claim 11, wherein the forwarding unit transmits the facsimile data displayed on the display from the transmitting/receiving unit via an external communication line to another facsimile apparatus.

15. The facsimile apparatus according to claim 11, further comprising a storage unit to save the facsimile data received by the transmitting/receiving unit, wherein the control unit saves the facsimile data displayed on the display in the storage unit if the instruction receiving unit receives a saving instruction.

* * * * *